UNITED STATES PATENT OFFICE 2,516,590

PROCESS FOR OBTAINING BODIED DRYING AND SEMIDRYING OILS

Burt Carlton Pratt, Wilmington, Del., assignor to E. I. du Pont de Nemours & Company, Wilmington, Del., a corporation of Delaware No Drawing. Application January 3, 1947, Serial No. 720,100

2 Claims. (Cl. 260—407)

This invention relates to oils useful in the manufacture of coating compositions, and more particularly to a method for obtaining bodied oils.

In the usual practice for obtaining bodied oils, a drying or semi-drying oil is heated in open or closed kettles, in the presence or absence of catalysts, to very high temperatures under conditions conducive to the bringing about of the desired degree of polymerization. In order to minimize color development during the heat treatment, it is customary to blanket the surface of the oil with a non-oxidizing gas, such as carbon dioxide. In the case of oils which have a pronounced tendency to polymerize, such as China-wood oil, the process is difficult to control because of the high temperatures employed and, unless careful control is exercised, the reaction has a propensity to proceed very rapidly resulting in the formation of gelled products. In the case of such fast-bodying oils the polymerization is usually checked by addition of a gum. The problem of producing bodied oils having improved properties with respect to drying rate and involving a reduction in the time and temperature required to achieve a given viscosity is a technically important one.

This invention has as an object a new and improved process for obtaining bodied oils. A further object is a method which yields bodied oils of improved properties with regard to drying time, and which reduces the time and temperature required to obtain a given viscosity. Other objects will appear hereinafter.

The above objects are accomplished by the method described herein which comprises conducting the heat treatment of the oil in contact with a small amount of an olefin/sulfur dioxide resin.

In carrying out the invention a drying or semidrying oil containing from 0.1 to 2% by weight of the olefin/sulfur dioxide resin is heated slowly with agitation in a kettle to between 250° and 350° C., and held at that temperature until the desired viscosity, which is usually at least 2 poises and preferably about 80 to 100 poises, has been attained. Thereafter the oil is removed from the fire, or gums may be added while hot and the cooking continued if higher viscosity is desired. The treated oil may be cut with suitable organic solvents, if desired, such as turpentine, xylene, high boiling gasolines, etc., or the oils used directly in formulating house paints, wall paints etc.

In the best practice of the invention the olefin/sulfur dioxide resin is used in amount of from 0.1 to 1% of the weight of the oil. The temperatures at which the process is most advantageously carried out are from 275° C. to 325° C.

The practice of this invention is further illustrated by the following example in which the parts are by weight.

Three separate portions of 700 parts of an alkali refined linseed oil were stirred at 305° C.±5° C. under nitrogen with 0.7, 3.5 and 7.0 parts respectively of an ethylene/sulfur dioxide resin. Small samples were removed from each at intervals to follow viscosity changes occurring in the drying oil. These intervals were 3 minutes, 17 minutes, 32 minutes, 45 minutes and continuing at 15 minute intervals thereafter. Some of the viscosity values of the oil samples examined at these intervals are as follows: When the oil contained 0.7 part or 0.1% by weight of the resin the viscosity increased from 0.65 poise in 3 minutes to 2.35 poises in 17 minutes, to 9.3 poises in 90 minutes, to 16.4 poises in 120 minutes, to 33.4 poises in 150 minutes and to 89.7 poises in 195 minutes. When the oil contained 3.5 parts or 0.5% of the resin the viscosity at the same periods of time up to 150 minutes was 1.0, 3.0, 26.8, 50.5 and 125.2 poises respectively. When the oil contained 7.0 parts or 1% of the resin the viscosity at the same periods of time up to 120 minutes was 1.15, 4.7, 46.3 and 80.9 poises respectively.

When the same sample of linseed oil used in the foregoing example was heated under the same conditions but without the olefin/sulfur dioxide resin 240 minutes were required to obtain a viscosity of 89.7 poises.

The ethylene/sulfur dioxide resin used in the foregoing example was obtained by the following procedure: A glass-lined pressure vessel was flushed with nitrogen, cooled to about −20° C., and 95 parts of sulfur dioxide and 1 part of alpha, alpha'-azodiisobutyronitrile added. The vessel was then flushed with nitrogen and pressured to 300 lbs./sq. in. with ethylene. This mixture was efficiently agitated and heated to 65° C. The pressure was maintained at 1000 lb./in.$^2$ by repressuring with ethylene until no further absorption of gas occurred. The total reaction time was about 8 hours. A quantitative yield of ethylene/sulfur dioxide polymer was produced as an almost white powder. Analysis of the polymer was: Found: C, 25.84, H, 4.55, S, 33.19; calculated for $(C_2H_4SO_2)_n$, C, 26.08, H, 4.34, S, 34.78.

By heat-treating linseed oil containing as little as 0.1% of the ethylene/sulfur dioxide resin at a temperature of 305° C. for four and three-fourths hours ungelled oils are obtained having a bubble time as high as 1450 seconds.

In order to test drying qualities, solutions of the heat-bodied oils obtained in accordance with the example were prepared by dissolving 10 parts of the polymerized oil in 6 parts of xylene. To portions of each of these solutions were added 0.02, 0.03, and 0.05% cobalt respectively in the form of cobalt naphthenate. After standing overnight, flow-outs were made and the following results observed. In 3½ hours films from the oil bodied with 0.1 and 0.5% ethylene/sulfur dioxide resin containing 0.05% cobalt were completely dust free, whereas a control, differing only in not having been bodied with the olefin/sulfur dioxide resin, required at least 4 hours to reach this stage. The panels containing 0.02 and 0.03% cobalt prepared with the bodied oils of the present invention were dust free in 4 hours whereas the controls with the same amount of cobalt prepared from normally bodied oil were not dust free after 5 hours. The films from the ethylene/sulfur dioxide resin bodied oils were of excellent color and quality.

The ethylene/sulfur dioxide resin used in the example can be replaced by other resins which contain combined sulfur dioxide and which are the reaction products of sulfur dioxide and an organic compound containing an ethylenic double bond as the sole aliphatic carbon-to-carbon unsaturation. Examples of these resins include the following: propylene/sulfur dioxide, butene-1/sulfur dioxide, hexene-1/sulfur dioxide, heptene-1/sulfur dioxide, trimethylene/sulfur dioxide, butene-2/sulfur dioxide, phenyl allyl ether/sulfur dioxide, cyclohexene/sulfur dioxide, undecylenic acid/sulfur dioxide and the like. Additional suitable resins of this kind are the diene/sulfur dioxide resins such as butadiene/sulfur dioxide, and the halogenated olefin/sulfur dioxide resins such as vinyl chloride/sulfur dioxide. Methods for the preparation of resins of this kind have been described in U. S. Patents 2,045,592, 2,128,932, 2,169,362, in British Patent 11,635 of 1914, and in other publications.

The present process is advantageously applied to the drying and semi-drying oils to which the usual heat-bodying treatments are applicable. Oils of this kind are linseed oil, alfalfa seed oil, cedar nut oil, chia seed oil, China-wood oil, oiticica oil, hempseed oil, pimento seed oil, safflower seed oil, soya bean oil, perilla oil, cotton seed oil, rape oil, jute seed oil, pine seed oil, and the like, and synthetic drying oils such as are disclosed in U. S. Patents 2,381,880 and 2,381,881.

The invention described herein provides an economical and practical method for obtaining bodied oils which are highly useful for formulation into paints and varnishes and which have good drying rates with excellent film properties, and which are useful in the manufacture of linoxyn type and other products.

As many apparently widely different embodiments of this invention may be made without departing from the spirit and scope thereof, it is to be understood that I do not limit myself to the specific embodiments thereof except as defined in the appended claims.

I claim:

1. A process for obtaining bodied oils which comprises heating at a temperature of from 250° C. to 350° C. until the desired viscosity is obtained an oil selected from the group consisting of drying and semi-drying oils in contact with, in amount of from 0.1% to 2% by weight of the oil, of a resin which contains combined sulfur dioxide and which is the reaction product of sulfur dioxide and an organic compound containing an ethylenic double bond as the sole aliphatic carbon-to-carbon unsaturation.

2. The process set forth in claim 1 in which said resin is an ethylene/sulfur dioxide resin.

BURT CARLTON PRATT.

No references cited.